Oct. 29, 1940.                M. ZOLA                 2,219,674
                         BUCKLE CONSTRUCTION
                         Filed June 10, 1938

INVENTOR.
MORRIS ZOLA
BY
Henry L. Burkitt
ATTORNEY.

Patented Oct. 29, 1940

2,219,674

UNITED STATES PATENT OFFICE 2,219,674

BUCKLE CONSTRUCTION

Morris Zola, New York, N. Y.

Application June 10, 1938, Serial No. 212,884

13 Claims. (Cl. 24—265)

This invention relates to buckle construction.

The invention will be described with particularity in relation to the ends of a belt which are to be joined together when the belt is worn as an article of apparel. It is to be understood, however, that since the invention may have application in other connections, it is not intended that the invention should be restricted to any such particularly described construction. Considering cloth belts particularly, the method of anchoring the ends of the belt to the buckle, in use at the present time, has many defects. For instance, the end of the belt may be passed through a number of slots, in order to lock the belt in position in those slots. To accomplish this result, it is necessary to thread the belt through such slots. Also, as can easily be understood, any such slot must provide a sufficient opening so that the belt end may readily be inserted into, and be passed through, the slot. Of course, such enlargement of the slot necessarily must permit, and result in, slippage of the belt through the slot, the belt being retained only as a result of the swelling of the belt material, released after it has been compressed into the slot. Of course, this latter again depends upon the particular belt material being used.

It is an object of the invention to provide belt-end-retaining means for association with devices such as buckles and belts, whereby, without threading, the belt end may be received and clamped in position by a simple operation, and wherein the belt end, when so received, is positively compressed and is so retained, so that slippage is prevented by a positive external force.

It is an object of the invention to provide means for retaining a belt end in association with a buckle member by calmping the belt end in position between a pair of members which, when in belt-end-engaging position, engage, at opposed faces of the belt end, against a bent portion of the belt end.

Other objects of this invention will hereinafter be set forth, or will be apparent from the description and the drawing, in which is illustrated an embodiment of apparatus for carrying out the invention.

The invention, however, is not intended to be restricted to a particular construction or arrangement of parts, nor to a particular application of such construction, nor to any specific method of use, nor to various details thereof, herein shown and described, as the same may be modified in various particulars, or be applied in many varied relations, without departing from the spirit and scope of the invention, the practical embodiment herein illustrated and described being merely to show a form or modification in which the invention might be embodied.

On the drawing, in which the same reference characters refer to the same parts throughout, and in which is disclosed the embodiment referred to:

Figure 1:
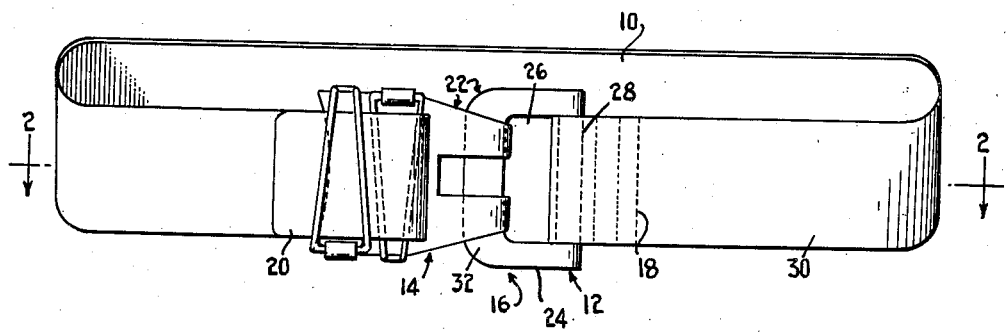
Fig. 1 is an elevational view of a construction showing a buckle embodying features of the invention in association with a belt.

In the construction shown on the drawing, a belt strap 10 is seen to have sections 12 and 14 of a buckle 16 attached at its ends 18 and 20. Elements 22, by which the buckle sections are anchored to each other, as, for instance, in closing the belt around the figure, may assume any desired form. In the instance shown, section 12 includes a body 24 having an opening 26. Across this opening may extend a pin 28, to which an end 18 of the strap may be secured, as, for instance, by being passed around the pin and then being stitched down against body 30 of the strap. Another cross-pin 32, which may be one of the elements, may extend across opening 26 to provide means with which prongs 34 of section 14, which may be the other of the elements, may be engaged to form the strap into figure-encircling shape.

Section 14 may be made up in any preferred manner. In the particular instance shown, it has been formed as a stamping from sheet metal, so as to include a base portion 36, the stamping including extending prongs 34. Pintle bearings 38 and 40 are provided with section 14, and are spaced apart laterally on base portion 36. In one type of construction, these pintle bearings may be formed during the stamping operation, by forming lugs at opposite edges 42 and 44 of the base portion, and bending the lugs into small cylinders or similar bearing-defining elements. Pivotally mounted in the pintle bearings are clamping fingers 46 and 48. These fingers are to be formed to be capable of applying a sufficiently positive pressure. In the particular instance shown, the fingers are bent from pieces of wire so that ends 50 of a bent piece may be engaged in a pintle bearing so that body portion 52 of the finger extends away from the pintle bearings, and is capable of pivoting movement. On such movement of a finger downwardly towards base portion 36, the body portion will extend substantially parallel to base portion 36.

The loop end 54 of each finger is bent substantially at right angles to body portion 52 to define an engaging prong 56. Each prong is so positioned, in the formation of the finger, that it will engage over the edge opposite the pintle bearing of that particular finger. Since, for certain purposes of the invention, it is desired that the finger, as well as its prong, be resilient, so that finger and prong will be retained positively in the position to which they are moved, the finger formed from spring wire is a preferred form.

In the formation of the finger from wire, the finger takes the form of a pair of pins 58 extending from ends 50. In one desired form, these pins are not substantially parallel to each other, but, in fact, converge away from ends 50 towards prong 56. Fingers 46 and 48, however, in the manner in which they are pivoted with relation to the respective edges 42 and 44, dispose their immediately adjacent pins 58 to assume, when the fingers are moved to clamping position, a substantially parallel relation to each other.

Figure 2:
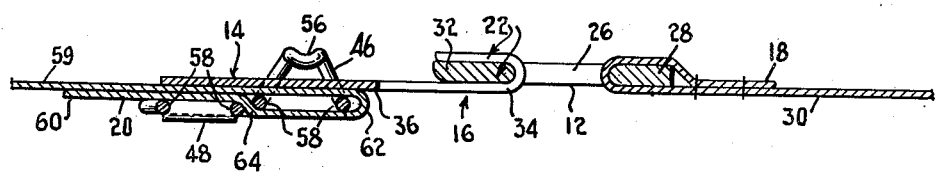
Fig. 2 is a cross-sectional view, substantially on the line 2—2 of Fig. 1, to enlarged scale, illustrating in detail the construction of the buckle.
Figure 3:
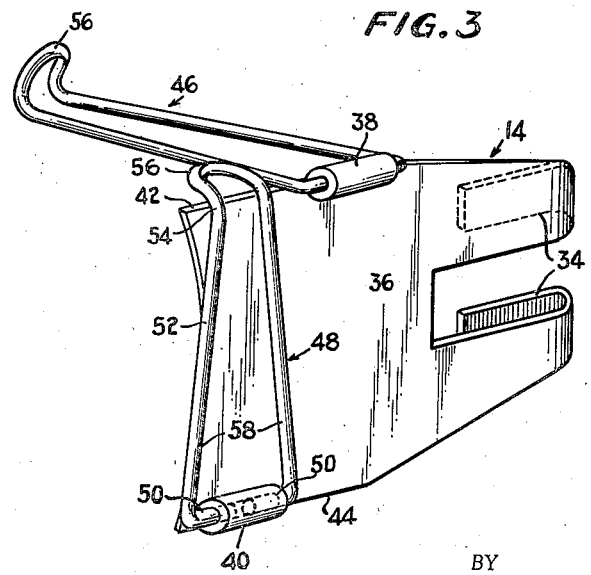
Fig. 3 is a perspective view of an element of the buckle construction, one of the fastener elements being shown in open position.
Figure 4:
Fig. 4 is an end view of a detail of the buckle construction.

In order to position belt end 20 in relation to section 14, with the fingers in open position as shown in Fig. 3, body portion 59 is laid upon base portion 36 so that extreme end edge 60 of the body portion extends beyond the position which will be assumed by the outermost pin 58 of finger 46 when the prong of that finger has engaged its associated edge 44 on movement of the finger to clamping position. Finger 46 is now moved down to engage body portion 59, and is pressed down positively so as to assure that the associated prong 56 engages over edge 44. The strap is now clamped against base portion 36. The belt end 60 is then bent back over the clamped strap, finger 46 forming the fold line. The strap is folded, as shown in Fig. 2, to a position where it lies directly upon the top face of the clamped body portion, forming a bend 62 around finger 46. Finger 48 is now moved downwardly against the superposed thicknesses, and so that its prong 56 engages edge 42. Finger 48 now clamps both thicknesses of the strap. At the same time, section 64 of the strap, which is caught between the immediately adjacent pins 58 of the fingers 46 and 48, is positively compressed, and held in bent condition, so that tendency to slip under longitudinal tension is materially prevented. Thus, the fabric, positively clamped against separation and prevented from running through between the two fingers, is anchored in section 14. the clamping action at the immediately adjacent pins 58, and the added distortion of the belt at this position, serve to lock the belt against any movement.

Many other changes could be effected in the particular device designed, and in the methods of use set forth, and in specific details thereof, without substantially departing from the invention intended to be defined in the claims, the specific description being merely to illustrate an operative embodiment capable of carrying out the spirit of the invention.

What is claimed as new and useful is:

1. A buckle member for a belt construction which includes a belt member and the buckle member, and wherein the buckle member provides means for detachably connecting together the ends of the belt member, the buckle member including an engaging section, the section having means for receiving and retaining one end of the belt member, the receiving-and-retaining means comprising a base, and a pair of immediately adjacent fingers mounted on and carried by the base and movable on the mountings towards the base from opposite directions for clamping the end of the belt member against the base.

2. A buckle member for a belt construction which includes a belt member and the buckle member, and wherein the buckle member provides means for detachably connecting together the ends of the belt member, the buckle member including an engaging section, the section having means for receiving and retaining one end of the belt member, the receiving-and-retaining means comprising a base, and a pair of immediately adjacent fingers mounted on the base to pivot towards the base from opposite directions for clamping the end of the belt member against the base.

3. A buckle member for a belt construction which includes a belt member and the buckle member, and wherein the buckle member provides means for detachably connecting together the ends of the belt member, the buckle member including an engaging section, the section having means for receiving and retaining one end of the belt member, the receiving-and-retaining means comprising a base, and a pair of immediately adjacent fingers mounted at opposite sides of the base to swing past each other in immediate adjacency and against the base for clamping the end of the belt member against the base.

4. Means for anchoring a folded belt end in a buckle section, the anchoring means including an engaging section, the section having means for receiving and retaining the folded belt end, the receiving-and-retaining means comprising a base, and a pair of fingers mounted on the base to move towards the base from opposite directions for clamping the folded belt end against the base, one of the fingers providing means for clamping a single thickness of the belt end against the base, and the other finger providing means for clamping the folded belt end against the base.

5. Means for anchoring a folded belt end in a buckle section, the anchoring means including an engaging section, the section having means for receiving and retaining the folded belt end, the receiving-and-retaining means comprising a base, and a pair of fingers mounted on the base to move towards the base from opposite directions for clamping the folded belt end against the base, one of the fingers providing means for clamping a single thickness of the belt end laid flat against the base and for forming means over which to fold the belt end back upon the clamped thickness, and the other finger providing means for clamping the superposed thickness of the folded belt end against the base.

6. Means for anchoring a belt end in a buckle section, the anchoring means including an engaging section, the section having means for receiving and retaining the belt end, the receiving-and-retaining means comprising a base, and a pair of fingers mounted at laterally spaced positions on the base to move towards the base from opposite directions for clamping the belt end against the base.

7. Means for anchoring a belt end in a buckle section, the anchoring means including an engaging section, the section having means for receiving and retaining the belt end, the receiving-and-retaining means comprising a base, and a pair of fingers pivoted at laterally spaced positions on the base to move towards the base from opposite directions for clamping the belt end against the base, and, when the fingers have moved into clamping position, to position edges of the respective fingers immediately adjacent to each other.

8. Means for anchoring a belt end in a buckle section, the anchoring means including an engaging section, the section having means for receiving and retaining the belt end, the receiving-and-retaining means comprising a base, and a pair of fingers pivoted at laterally spaced positions on the base to move towards the base from opposite directions for clamping the belt end against the base, and, when the fingers have moved into clamping position, to position edges of the respective fingers immediately adjacent and substantially parallel to each other.

9. Means for anchoring a belt end in a buckle section, the anchoring means including an engaging section, the section having means for receiving and retaining the belt end, the receiving-and-retaining means comprising a base, and a pair of fingers pivoted at laterally spaced positions on the base and tapering away from the pivot axes, the fingers being capable of movement down against the base for clamping the belt end against the base.

10. Means for anchoring a belt end in a buckle section, the anchoring means including an engaging section, the section having means for receiving and retaining the belt end, the receiving-and-retaining means comprising a base, and a pair of fingers pivoted at laterally spaced positions on the base and tapering away from the pivot axes, the fingers being capable of movement down against the base and into immediate adjacency to each other for clamping the belt end against the base, the fingers, when moved into clamping position, receiving a portion of the belt member between said immediately adjacent edges of the fingers.

11. Means for anchoring a belt end in a buckle section, the anchoring means including an engaging section, the section having means for receiving and retaining the belt end, the receiving-and-retaining means comprising a base, and a pair of fingers pivoted at the opposite edges of the base to move towards the base from opposite directions for clamping the belt end against the base, each finger having means for engaging the edge opposite its pivot to anchor the finger in clamping relation to the base.

12. Means for anchoring a belt end in a buckle section, the anchoring means including an engaging section, the section having means for receiving and retaining the belt end, the receiving-and-retaining means comprising a base, and a pair of resilient fingers pivoted at laterally spaced positions on the base to move towards the base from opposite directions for clamping the belt end against the base, the free end of each finger forming a resilient prong for engaging over the edge opposite its pivot.

13. Means for anchoring a folded belt end in a buckle section, the anchoring means including an engaging section, the section having means for receiving and retaining the folded belt end, the receiving-and-retaining means comprising a base, and a pair of resilient fingers pivoted at laterally spaced positions on the base to move towards the base from opposite directions for clamping the folded belt end against the base, one of the fingers providing means for clamping a single thickness of the belt end laid flat against the base and for forming means over which to fold the belt end back over and upon the clamped thickness, and the other finger providing means for clamping the superposed thicknesses of the belt end against the base, each finger having means for engaging the edge opposite its pivot to anchor the finger in clamping relation to the base; edges of the respective fingers, when the fingers are in clamping position, being in position immediately adjacent to each other, the belt end being held between the immediately adjacent edges when the fingers are down against the base.

MORRIS ZOLA.